Feb. 24, 1959 D. C. PROBST 2,874,993
LATCH FOR PIVOTING SEAT
Filed Jan. 17, 1955 3 Sheets-Sheet 1
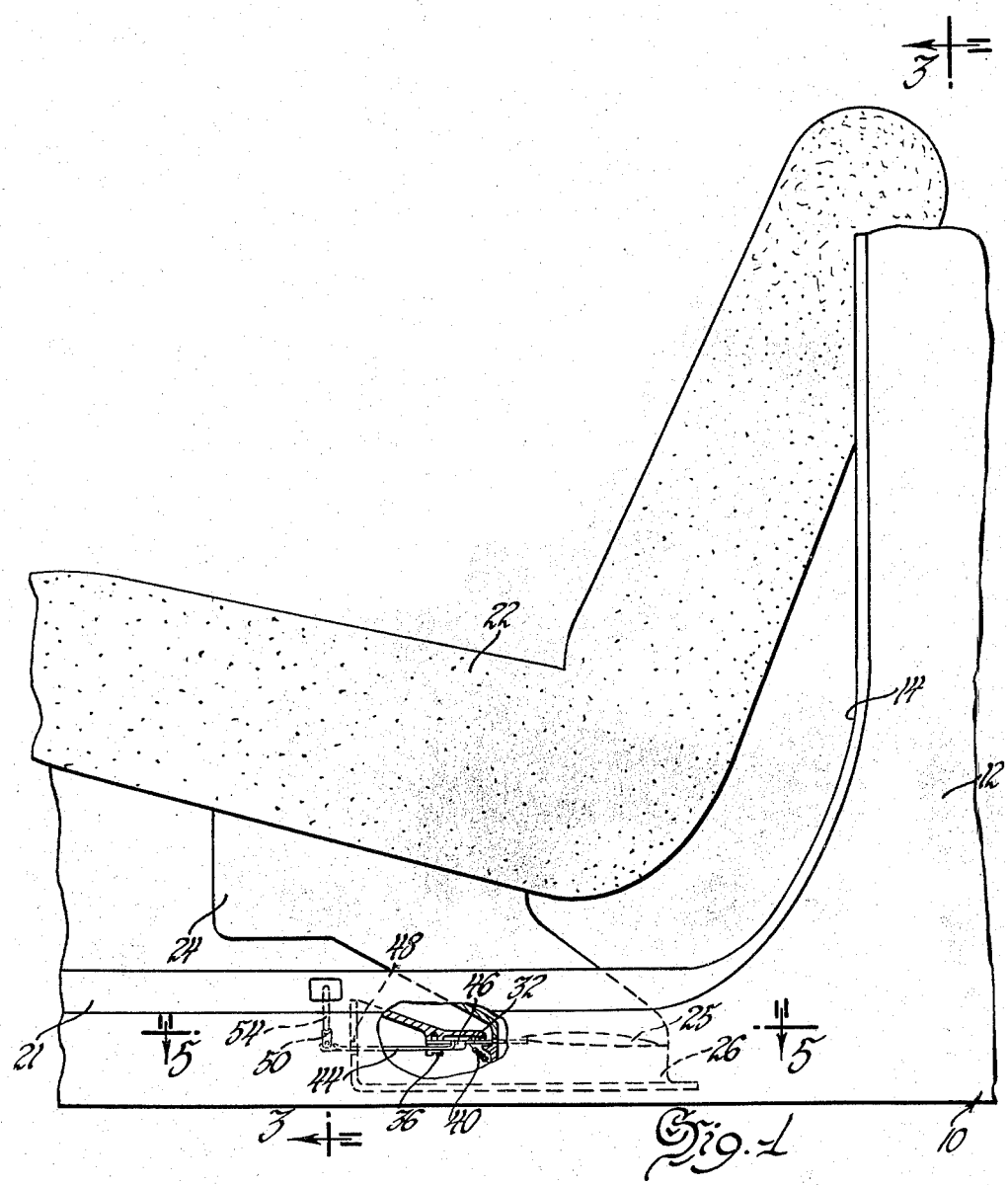
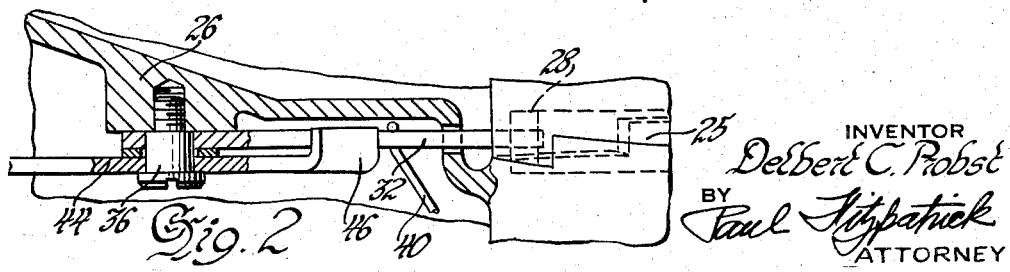
INVENTOR
Delbert C. Probst
BY
Paul Fitzpatrick
ATTORNEY Feb. 24, 1959  D. C. PROBST  2,874,993
LATCH FOR PIVOTING SEAT
Filed Jan. 17, 1955  3 Sheets-Sheet 2
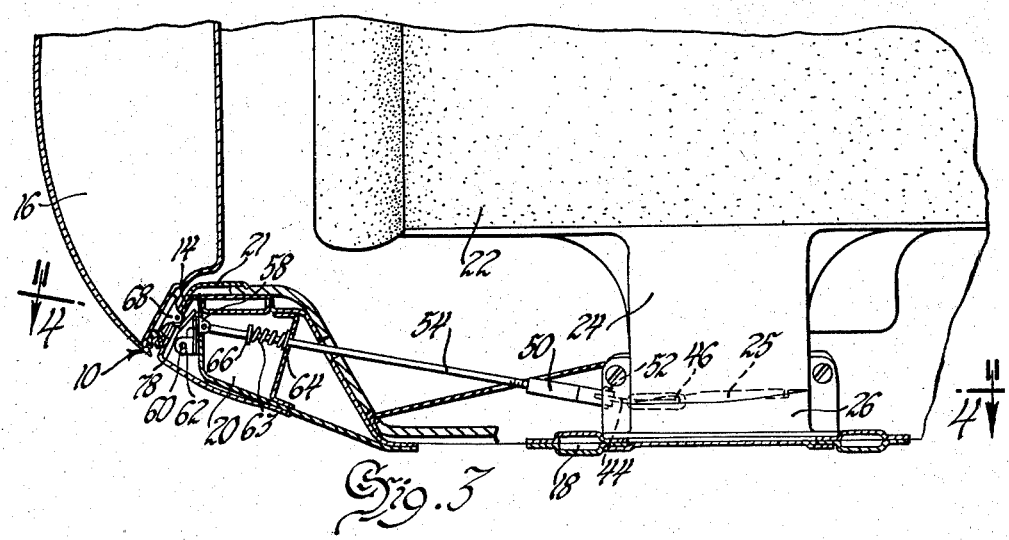
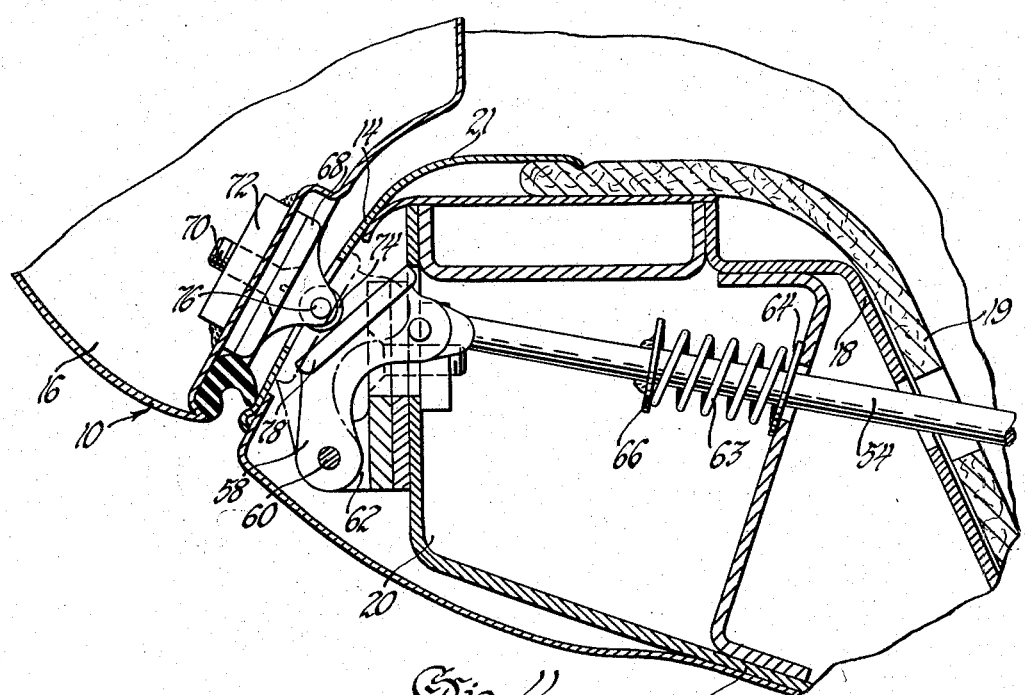
INVENTOR
Delbert C. Probst
BY
Paul Fitzpatrick
ATTORNEY Feb. 24, 1959 D. C. PROBST 2,874,993
LATCH FOR PIVOTING SEAT
Filed Jan. 17, 1955 3 Sheets-Sheet 3

INVENTOR
Delbert C. Probst
BY
Paul Fitzpatrick
ATTORNEY

United States Patent Office 2,874,993
Patented Feb. 24, 1959

2,874,993

LATCH FOR PIVOTING SEAT

Delbert C. Probst, Detroit, Mich., assignor to General Motors Corporation, Detroit, Mich., a corporation of Delaware Application January 17, 1955, Serial No. 482,221

3 Claims. (Cl. 296—65)

This invention relates to a latching means, and more particularly to latching means for a seat in a vehicle body.

One feature of the invention is that it provides an improved latching means; another feature of the invention is that it provides latching means responsive to opening movement of the vehicle door for releasing the latch; still another feature of the invention is that it provides a latch for a pivoting seat, the latch holding the seat in its normal forwardly facing position when the vehicle door is closed and the latch being released in response to opening movement of the door; yet another feature of the invention is that it provides latching means for a seat in a vehicle body having a door and a seat pivotally mounted in the body, the latch including a dog for holding the seat against pivotal movement when the door is closed, operating means for the dog and an actuator on the door adapted to engage the operating means when the door is closed to hold the latch in latched position.

Other features and advantages of the invention will be apparent from the following description and from the drawings, in which:

Fig. 1 is a fragmentary side elevation of a vehicle body having a pivoted seat held by the improved latching means;

Fig. 2 is an enlarged detail section showing the latching means of Fig. 1;

Fig. 3 is a vertical transverse section through a portion of the seat and the door;

Fig. 4 is a horizontal section taken along the line 4—4 of Fig. 3; and

Figure 5:
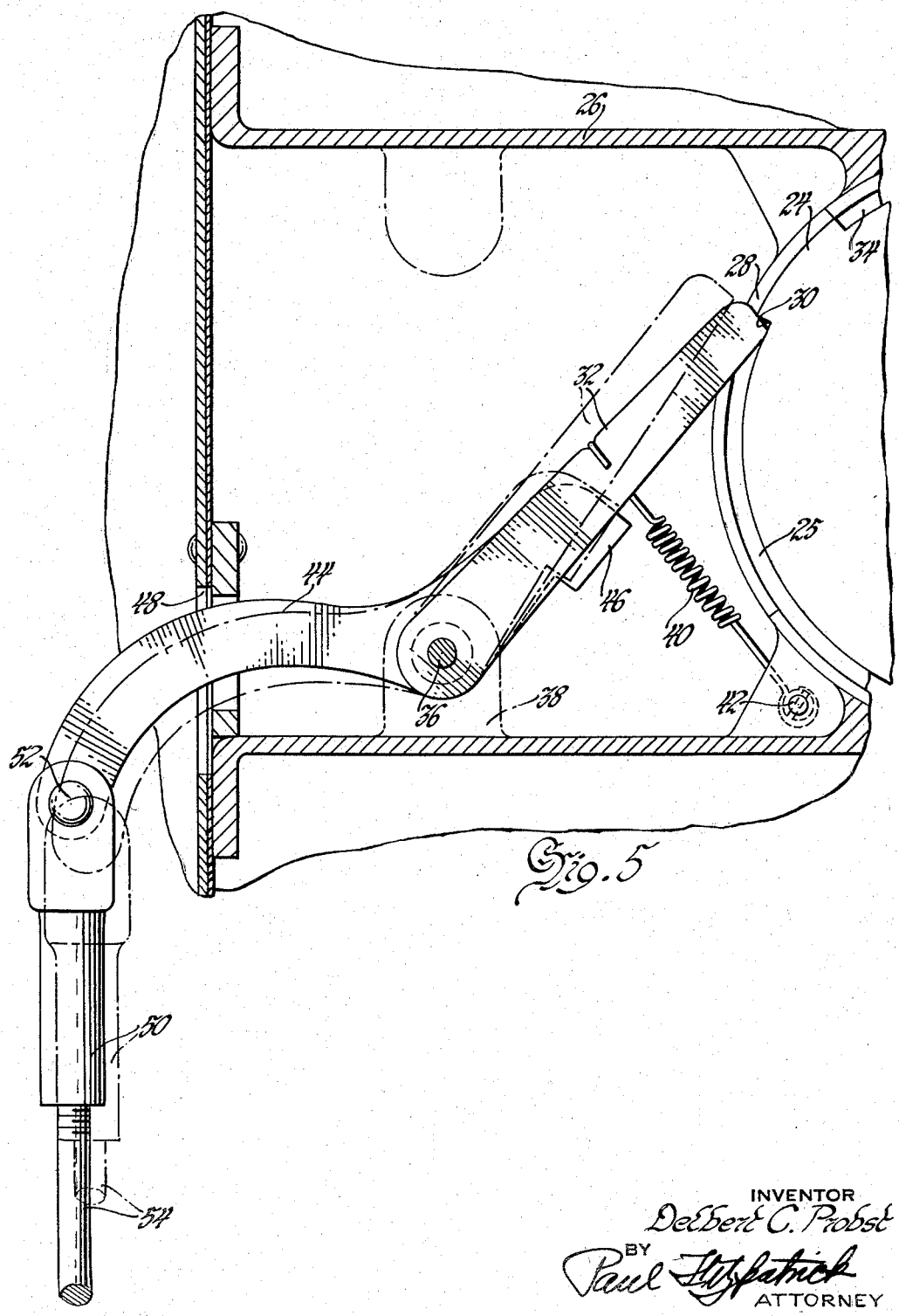
Fig. 5 is a horizontal section showing the latch, the parts being shown in latched position in solid lines and in unlatched position in broken lines.

The latch disclosed and claimed herein is particularly adapted for use in an automobile having a pivoting seat. When the door is closed, and especially when the automobile is in motion, it is desirable to latch the seat in its normal forwardly facing position. In order to facilitate ingress to or egress from the automobile when the door is open, the seat may be pivoted so that it faces toward the automobile door; but such pivoting movement of the seat is undesirable (and may be dangerous in the case of the driver's seat) when the door is closed and the automobile is in motion.

This latch holds the seat in its normal forward position whenever the door is closed, and the latch is automatically released by means responsive to opening movement of the door so that the seat may be pivoted to face the door whenever the door is open.

Referring now more particularly to the drawings, an automobile body designated generally as 10 has a side body panel 12 with a door opening 14 in which a door 16 is hingedly mounted in conventional manner. The floor 18 of the automobile is covered by a carpet 19 and terminates along its side in a sill or rocker panel 20 as is conventional. A scuff plate 21 overlies the rocker panel and holds the edge of the carpet in place. Mounted on the floor 18 is a seat 22 which may be of the so-called bucket type. The seat is carried on a seat support pedestal 24 which is pivotally mounted on a turntable 25 on a floor support 26 so that the seat may be pivoted between a normal forwardly facing terminal position and a side terminal position facing toward the door opening. The particular pivoting seat illustrated in the drawing is shown and described in the copending application of Joseph H. Gilson and Victor M. Teerlinck, entitled "Pivoting Seat," filed January 17, 1955, as Serial No. 482,222.

The seat supporting pedestal 24 has a lug 28 with a latching shoulder 30 which is adapted to be engaged by a pivoted dog 32 when the seat 22 is in its forwardly facing terminal position. A stop 34 prevents the seat from pivoting in a direction away from the door past its forward terminal position. The dog 32 is pivotally mounted upon a screw 36 which extends from an ear 38 projecting from the floor support 26 and a tension spring 40 has one end hooked over the dog 32 and the other end anchored to a screw 42 on the floor support 26 so that the spring yieldably urges the dog towards its latched position in engagement with the shoulder 30.

In order to provide operating means for the latching dog operable in response to door opening movement to unlatch the dog 32, there is a lever 44 pivotally mounted upon the screw 36 and having at one end a turned tab 46 which overlies the dog 32 and makes a one-way connection therewith operable only in the unlatching direction. Another arm of the lever projects through an opening 48 in the floor support 26 and is pivotally connected in a yoke member 50 by a pin 52. The other end of the yoke member has a threaded bore into which the threaded end of a push rod 54 is turned. This threaded connection permits adjustment of the length of the operating linkage.

The push rod 54 extends to a point adjacent the door 16, projecting through an opening in the floor carpet 19 and through aligned openings in the floor 18 and in the inner wall of the rocker panel 20. The outer end of the rod 54 terminates adjacent the door 16 and is pivotally connected to a follower member 58 which is pivotally mounted at 60 on a support bracket 62 which is bolted to the outer wall of the rocker panel under the scuff plate 21. Within the rocker panel 20 there is a compression spring 63 which surrounds the rod 54, being seated at one end on a washer 64 which lies against the inner wall of the rocker panel and being seated at the other end on a collar 66 which is welded to the rod. This spring urges the rod outwardly, tending to pull on the lever 44 and so move the dog 32 in a counter-clockwise direction (see Fig. 5) to release the latch.

Adjacent the bottom edge of the door there is an actuator comprising a mounting block 68 secured to the door by a screw 70 and a nut 72 inside the door. The mounting block 68 is formed as a yoke which, between its arms, carries a roller 74 on a pin 76. As shown in Figs. 3 and 4, when the door is closed the roller 74 projects through an opening in the scuff plate 21 and engages a flange 78 on the follower 58, moving the follower and rod 54 inwardly and compressing the spring 63. The inward movement of the rod moves the lever 44 to the position shown in solid lines in Fig. 5, permitting spring 40 to pull dog 32 to its latching position. When the door is opened the roller 74 moves out away from the flange 78 on the follower 58 and spring 63 (which exerts several times the force of spring 40) moves the rod 54 outwardly, moving the lever 44 and dog 32 to the unlatched position shown in broken lines in Fig. 5. In the event the latch should be in its latched position before the seat is pivoted to its forwardly facing terminal position, the latching projection on the seat support will cam over the spring-biased dog 32 to permit the seat to be returned to its normal forwardly facing position.

With this latch, whenever the door is open the seat is automatically unlatched for free pivotal movement to its side terminal position, but when the door is closed, the seat is automatically latched against pivotal movement.

While I have shown and described one embodiment of my invention, it is capable of many modifications. Changes, therefore, in the construction and arrangement may be made without departing from the spirit and scope of the invention as set forth in the appended claims.

I claim:

1. Latching means for a seat in a vehicle body, comprising: a door hingedly mounted on said body; a seat supporting pedestal pivotally mounted in said body, said pedestal having a latching shoulder; a dog pivotally mounted on said body for movement between a latching position in engagement with said shoulder and an unlatching position out of engagement therewith; first spring means yieldably urging said dog towards latching position; operating means for said dog including a lever pivotally mounted on said body coaxially with said dog and having a one-way connection with said dog, a rod connected to said lever and extending to a location adjacent the door, and a follower mounted adjacent the door and connected to said rod; second spring means yieldably urging said rod, lever and dog toward unlatching position, said second spring means being stronger than said first spring means; and an actuator on said door, including a roller adapted to engage said follower when the door is closed to hold the operating means in latched position against the force of said second spring means.

2. Latching means for a seat in a vehicle body, including: a door hingedly mounted on said body; a seat supporting pedestal pivotally mounted in said body, said pedestal having a latching shoulder, a seat mounted on said pedestal; a dog mounted on said body for pivotal movement between a latching position in engagement with said shoulder to block pivotal movement of the seat in one direction and an unlatching position out of engagement with said shoulder; a first spring means yieldably urging said dog toward latching position; operating means for said dog including a lever having a one-way connection with said dog, a push rod connected to said lever and extending to a location adjacent the door, and a follower mounted adjacent the door and connected to said rod; a second spring means yieldably urging said rod, lever and dog toward unlatching position, said second spring means being stronger than said first spring means; and an actuator on said door, including a roller adapted to engage said follower when the door is closed to hold the operating means in latched position against the force of said second spring means.

3. Latching means for a seat in a vehicle body, comprising: a door hingedly mounted on said body; seat supporting means pivotally mounted in said body, said means having a curved peripheral edge terminating in a latching shoulder; a dog pivotally mounted on said body for movement between a latching position wherein it rides on said curved edge and is adapted to engage said shoulder and an unlatching position out of engagement with said edge and shoulder; means yieldably urging said dog toward latching position; operating means for said dog responsive to opening movement of the door for releasing the latch, said operating means including a lever pivotally mounted on said body coaxially with said dog and having a one-way connection with said dog for moving said dog to unlatching position, a push rod pivotally connected to said lever and extending to a location adjacent said door, and spring means yieldably urging said rod, lever and dog toward unlatching position; and an actuator on said door adapted to engage said operating means when the door is closed to hold the operating means in latched position.

References Cited in the file of this patent

UNITED STATES PATENTS

| 761,794 | Tower | June 7, 1904 |
| 1,682,989 | Smelker | Sept. 4, 1928 |
| 2,034,570 | Flavin | Mar. 17, 1936 |
| 2,624,613 | Parmely | Jan. 6, 1953 |

FOREIGN PATENTS

| 384,641 | Great Britain | Mar. 2, 1931 |